US005867120A

United States Patent [19]

Ishikawa et al.

[11] Patent Number: 5,867,120

[45] Date of Patent: Feb. 2, 1999

[54] TRANSMITTER-RECEIVER

[75] Inventors: Yohei Ishikawa; Toru Tanizaki, both of Kyoto; Hiroshi Nishida, Kawanishi, all of Japan

[73] Assignee: Murata Manufacturing Co., Ltd., Japan

[21] Appl. No.: 886,650

[22] Filed: Jul. 1, 1997

[30] Foreign Application Priority Data

Jul. 1, 1996 [JP] Japan .................................... 8-171351

[51] Int. Cl.[6] ........................................................ G01S 7/28

[52] U.S. Cl. ............................................... 342/175; 342/70

[58] Field of Search ................................ 342/175, 70, 71, 342/72; 343/700 MS

[56] References Cited

U.S. PATENT DOCUMENTS 5,392,051 2/1995 Uematsu et al. ........................ 342/165
5,394,154 2/1995 Uematsu et al. ........................ 342/165
5,416,492 5/1995 Takahashi et al. ...................... 343/771
5,604,469 2/1997 Ishikawa et al. ........................ 333/1.1
5,640,700 6/1997 Shingyoji et al. ...................... 455/328
5,666,094 9/1997 Kato et al. .............................. 333/428
5,717,400 2/1998 Uematsu et al. ........................ 342/165
5,724,013 3/1998 Ishikawa et al. ....................... 333/254
5,781,086 7/1998 Kato et al. .............................. 333/248

*Primary Examiner*—John B. Sotomayor
*Attorney, Agent, or Firm*—Ostrolenk, Faber, Gerb & Soffen, LLP

[57] ABSTRACT

A transmitter-receiver whose overall size can be reduced by decreasing areas occupied by a bend portion and a coupler portion of a nonradiative dielectric (NRD) waveguide. The size is not restricted by the radius of curvature and the bending angle of the bend portion. In this transmitter-receiver, the NRD waveguide is adapted so that waves are transmitted in a single mode, namely, LSM01 mode. Further, an oscillator, an isolator, a mixer and a coupler are placed in the rear of a dielectric lens. Thus, the transmitter-receiver fits within the size of the antenna.

6 Claims, 17 Drawing Sheets

TRANSMITTER-RECEIVER

BACKGROUND OF THE INVENTION

1. Field of the Invention

This invention generally relates to a transmitter-receiver for use in mobile units, for example, a vehicle or a ship, and, more particularly, to a transmitter-receiver for use when measuring the distance and the relative velocity between such mobile units.

2. Description of the Related Art

There has been developed what is called an automobile millimeter-wave radar which aims at measuring the distance between a vehicle and another vehicle running in front or rear thereof while the vehicles are running on a road. Generally, such a radar comprises a transmitter-receiver is produced in a module composed of a millimeter-wave oscillator, a circulator, a coupler, a mixer and an antenna, and is mounted on a front or rear portion of a vehicle.

For instance, as shown in FIG. 16, a truck measures the distance therefrom to a passenger car running in front thereof and the relative velocity therebetween by transmitting and receiving millimeter waves in accordance with a frequency modulated-continuous wave (FM-CW) method. FIG. 17 is a block diagram illustrating the configuration of the entire millimeter-wave radar. A transmitter-receiver and an antenna of this figure are mounted on a front portion of the vehicle or truck in the case of the example illustrated in FIG. 16. In contrast, a signal processing unit is usually provided at an arbitrary location in the vehicle. A signal processing portion provided in the signal processing unit is operative to extract as numerical information the distance therefrom to the vehicle, which runs in front thereof, and the relative velocity therebetween, as numerical information by using the transmitter-receiver. Further, a control-alarm portion is operative to issue an alarm according to the relation between the running speed of the vehicle or truck and the relative velocity thereof, for example, when predetermined conditions are met, or when the relative velocity thereof with respect to the vehicle running in front thereof exceeds a threshold value.

FIG. 18 is a schematic plan diagram illustrating the configuration of a prior art transmitter-receiver. In this figure, reference numeral 2 designates a circulator, on the two sides of which an oscillator 1 and a terminating device 3 are placed, respectively. Reference numeral 11 denotes a dielectric resonator that acts as a primary radiator for transmitting waves. Further, a dielectric strip 4 is placed between the circulator 2 and this dielectric resonator 11. Reference numeral 12 designates a dielectric resonator acting as a primary radiator for receiving waves; and 15 a mixer. Moreover, a dielectric strip 14 is placed therebetween. Moreover, a linear dielectric strip 6, curved dielectric strips 5 and 7, and terminating devices 8 and 9 are placed as illustrated in this figure.

Furthermore, a coupler 10 is provided by a proximity portion, where the dielectric strips 4 and 5, are close to each other. Additionally, another proximity portion, where the dielectric strips 14 and 7 are close to each other, provide a coupler 13. Further, dielectric lenses 16 and 17 are mounted on the upper portions of the dielectric resonators 11 and 12, respectively.

FIG. 19 is a diagram illustrating an equivalent circuit of the transmitter-receiver shown in FIG. 18. The oscillator 1 is provided with a varactor diode and a Gunn diode. Further, an oscillation signal outputted therefrom is transmitted or propagated to the dielectric resonator 11 through the circulator 2 and is then radiated through the dielectric lens 16. The circulator 2 and the terminating device 3 compose an isolator. An RF signal received through the dielectric lens 17 and the dielectric resonator 12 propagates the dielectric strip 14. A local oscillator (LO) signal is mixed into the dielectric strip 14 by the couplers 10 and 13 and is further inputted to a mixer 15. This mixer 15 is constituted by a Schottky barrier diode and generates IF (intermediate frequency) signals.

FIG. 20 is a schematic plan view of the transmitter-receiver in the case where a transmit/receive antenna is used in common for both transmitting and receiving. In this figure, reference numeral 2 designates a circulator. Further, an oscillator 1, a mixer 15 and a dielectric resonator 11 serving as a primary radiator are placed at ports of the circulator 2 through dielectric strips 4, 14 and 18, respectively. Furthermore, a coupler is configured by bringing a curved dielectric strip 19, whose both ends are terminated, close to dielectric strips 4 and 14.

FIG. 21 is a diagram illustrating an equivalent circuit of the transmitter-receiver shown in FIG. 20. A signal outputted from the oscillator 1 is radiated by the antenna, which is comprised of the dielectric resonator 11 and the dielectric lens 16, through the dielectric strip 4, the circulator 2 and the dielectric strip 18. Further, waves reflected from an object are inputted to the mixer 15 through the dielectric strip 18, the circulator 2 and the dielectric strip 14. The inputted waves are mixed by a coupler, which consists of the dielectric strips 4, 14 and 19, resulting in a mixed signal (RF signal+LO signal), and the mixed signal is inputted to the mixer 15 that is constituted by a Schottky barrier diode and is operative to generate IF signals.

Another type of transmitter-receiver for use in a millimeter-wave radar using a conventional nonradiative dielectric (NRD) waveguide is designed to use a NRD waveguide of the configuration illustrated in FIGS. 22A and 22B. In FIG. 22A, reference numerals 101 and 102 designate conductive plates, respectively. Further, dielectric strips 100*a* and 100*b* and a substrate 103 are placed between these two conductive plates. Further, by appropriately setting the distance between the aforementioned conductive plates, the size of the dielectric strips and their relative dielectric constant (or permittivity), the dielectric strip portions are established as propagating regions and the other regions become non-propagating regions (namely, blocking regions). For example, when the size or dimension of each portion and the relative dielectric constant are determined as shown in FIG. 23B, the transmission of signals in the propagating region is realized only in a certain range of frequencies, which are not less than a predetermined value, as is seen from phase constant characteristics illustrated in FIG. 23A.

However, LSM01 mode and LSE01 mode, which are basic transmission modes of an NRD waveguide, are orthogonal to each other, so that low-loss characteristics are exhibited in the case of a straight-line path. Nevertheless, in the case of a curved path (namely, in the curved strips described above), the orthogonality is lost and a coupling is caused between these modes. Thus, low-loss characteristics are obtained only in a range restricted by a radius of curvature and a bending angle. In the case of the waveguide having the dimensions shown in FIG. 23B, if the bending angle is, for instance, 60 degrees, characteristics, by which the loss is minimized, are obtained in the case where the radius of curvature is 36.3 mm. Further, if the bending angle is 90 degrees, characteristics, by which the loss is minimized, are obtained in the case where the radius of curvature is 22.5 mm. Therefore, the loss increases if the value of the radius of curvature is other than 36.3 mm when the bending angle is, for instance, 60 degrees. Thus, in the case of the conventional transmitter-receiver, the degree of freedom in designing the bend portion and in constituting the coupler by the bend portion is low. Consequently, the size of the transmitter-receiver is not reduced so much even when designing the transmitter-receiver in such a manner as to minimize the size of the bend portion and the transmission loss of the coupler.

On the other hand, the aperture diameter of an antenna is determined according to the specifications of a transmitter-receiver. Namely, in a condition in which the breadth of the major lobe of a radiation (or field) pattern of a transmitted beam (or wave) at a distance of 100 m in front of the antenna is not more than 3.5 m, the beam width is 2 degrees. For instance, it is necessary to set the aperture diameter of the radiator of the antenna at 170 mm. Further, in a condition in which the breadth of the major lobe of a radiation pattern of a transmitted beam at a distance of 50 m in front of the antenna is not more than 3.5 m, the beam width is 4 degrees. For instance, it is necessary to set the aperture diameter of the radiator of the antenna at 80 mm. Thus, the aperture diameter of the antenna is necessarily determined according to the specifications of the transmitter-receiver. As illustrated in FIG. 18, in the case of the prior art transmitter-receiver, the size of the region in which the elements such as the oscillator, the circulator and mixer are formed, is larger than the antenna size, so that the size of the entire transmitter-receiver cannot help becoming large.

SUMMARY OF THE INVENTION

Accordingly, an object of the present invention is to provide a transmitter-receiver whose overall size can be reduced by decreasing the areas occupied by a bend portion and a coupler portion without being restricted by the radius of curvature of and the bending angle of the bent portion of the aforementioned NRD waveguide.

To achieve the foregoing object, in accordance with an aspect of the present invention, there is provided a transmitter-receiver (hereunder sometimes referred to as a first transmitter-receiver) which comprises a transmit antenna, a receive antenna and a plurality of elements that include at least a millimeter-wave oscillator and a mixer. The aforesaid plurality of elements are connected with one another through NRD waveguides, each of which has a dielectric strip interposed between two nearly parallel two conductive plates. In this transmitter-receiver, the aforesaid transmit antenna and receive antenna each comprise a vertical primary radiator and a dielectric lens. Further, the aforesaid transmit antenna and receive antenna are placed side by side.

Moreover, the distance between a propagating region and a non-propagating region, and the dielectric constant of a dielectric material interposed between the aforesaid propagating region and non-propagating region, are determined in each of the aforesaid NRD waveguides so that a cut-off frequency in LSM01 mode is lower than a cut-off frequency in LSE01 mode.

Furthermore, the aforesaid plurality of elements and the aforesaid NRD waveguides are placed in a rear part of the aforesaid dielectric lens or in rear of an area at which the aforesaid dielectric lens is mounted. Thus, because the cut-off frequency in LSM01 mode is lower than the cut-off frequency in LSE01 mode, only waves in a single mode, namely, LSM01 mode are propagated. Therefore, even when the radius of curvature of a bend portion is small and the bending angle thereof is large, low-loss characteristics are always obtained. Thus, there is realized the placement of the plurality of elements such as the oscillator and mixer in the rear of the aforesaid dielectric lens or in the rear of an area at which the aforesaid dielectric lens is mounted. Consequently, the size of the entire transmitter-receiver is reduced to the necessary minimum antenna size.

Further, in accordance with another aspect of the present invention, there is provided a transmitter-receiver (hereunder sometimes referred to as a second transmitter-receiver) which comprises a transmit/receive antenna and a plurality of elements that include at least a millimeter-wave oscillator and a mixer. Moreover, the aforesaid plurality of elements are connected with one another through NRD waveguide that has a dielectric strip interposed between two nearly parallel conductive plates. In this transmitter-receiver, the aforesaid transmit/receive antenna comprises a vertical primary radiator and a dielectric lens. Furthermore, the distance between a propagating region and a non-propagating region and a dielectric constant of a dielectric material interposed between the propagating region and the non-propagating region are determined in each of the aforesaid NRD waveguides so that a cut-off frequency in LSM01 mode is lower than a cut-off frequency in LSE01 mode. Additionally, the plurality of elements and the NRD waveguides are placed in a rear part of said dielectric lens or in a rear part of an area at which the aforesaid dielectric lens is mounted.

As above described, in the case of the first and second transmitter-receivers of the present invention, the cut-off frequency in LSM01 mode is lower than the cut-off frequency in LSE01 mode. Thus, only waves in a single mode, namely, LSM01 mode, are propagated. Therefore, even when the radius of curvature of a bend portion is small and the bending angle thereof is large, low-loss characteristics are always obtained. Thereby, there is realized the placement of the plurality of elements such as the oscillator and mixer in rear of the aforesaid dielectric lens or in rear of an area at which the aforesaid dielectric lens is mounted. Consequently, the size of the entire transmitter-receiver is reduced to the necessary minimum antenna size.

Moreover, in the case of a feature (hereunder sometimes referred to as a third transmitter-receiver of the present invention) of the second transmitter-receiver of the present invention, the aforesaid vertical primary radiator is constituted by a dielectric resonator in HE111 mode. Further, an edge portion of the aforesaid NRD waveguide for giving a transmission signal to the aforesaid dielectric resonator, and an edge portion of the aforesaid NRD waveguide for receiving a reception signal from the aforesaid dielectric resonator are set in such a manner as to face each other in a direction at 90 degrees to said dielectric resonator. Furthermore, a 3-dB directional coupler is constituted between the aforesaid NRD waveguides.

In addition, NRD waveguides connect between the aforesaid millimeter-wave oscillator and the aforesaid isolator, between the aforesaid isolator and the aforesaid 3-dB directional coupler and between the aforesaid 3-dB directional coupler and the aforesaid mixer, respectively. Further, a coupler, which is connected to an NRD waveguide for transmitting a transmission signal and to an NRD waveguide for transmitting a reception signal and is operative to give a mixture of a transmission signal and a reception signal, is constituted by an NRD waveguide. With this configuration, a transmission signal is inputted to the 3-dB directional coupler and is thus equidistributed and outputted to the dielectric resonator in such a way as to have a phase difference of 90 degrees.

Therefore, the dielectric resonator in HE111 mode radiates circularly polarized waves in an axial direction thereof. On the other hand, a reception wave having been incident thereon in an oppositely polarized manner, similarly as in the case of the transmission wave is propagated through a dielectric resonator in such a way as to have a phase difference of 90 degrees with respect to two NRD waveguides facing this dielectric resonator. Further, the incident reception wave is outputted to the mixer through the 3-dB directional coupler without being outputted to an input port for the transmission wave. Thus, the circulator for branching signals becomes unnecessary. This further facilitates the placement of the dielectric lens or the placement of the elements in the mounting area.

Furthermore, in the first to third embodiments of the present invention, the aforesaid dielectric lens is constructed by multiple layers of dielectric materials which have different dielectric constants, respectively. Thereby, the distance from the position of the primary radiator to the protruding end portion of the dielectric lens is reduced. Thus, a reduction in thickness of the entire transmitter-receiver is achieved. Moreover, the antenna gain can be enhanced by making the intensity of the electromagnetic waves propagating through the aperture of the dielectric lens more uniform. Consequently, the size of the transmitter-receiver can be reduced by an amount corresponding thereto.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE EMBODIMENTS

Hereinafter, several embodiments of the present invention will be described in detail by referring to the accompanying drawings.

First, a transmitter-receiver, which is the first embodiment of the present invention, will be described hereunder with reference to FIGS. 1A to 9B.

Figure 1A:
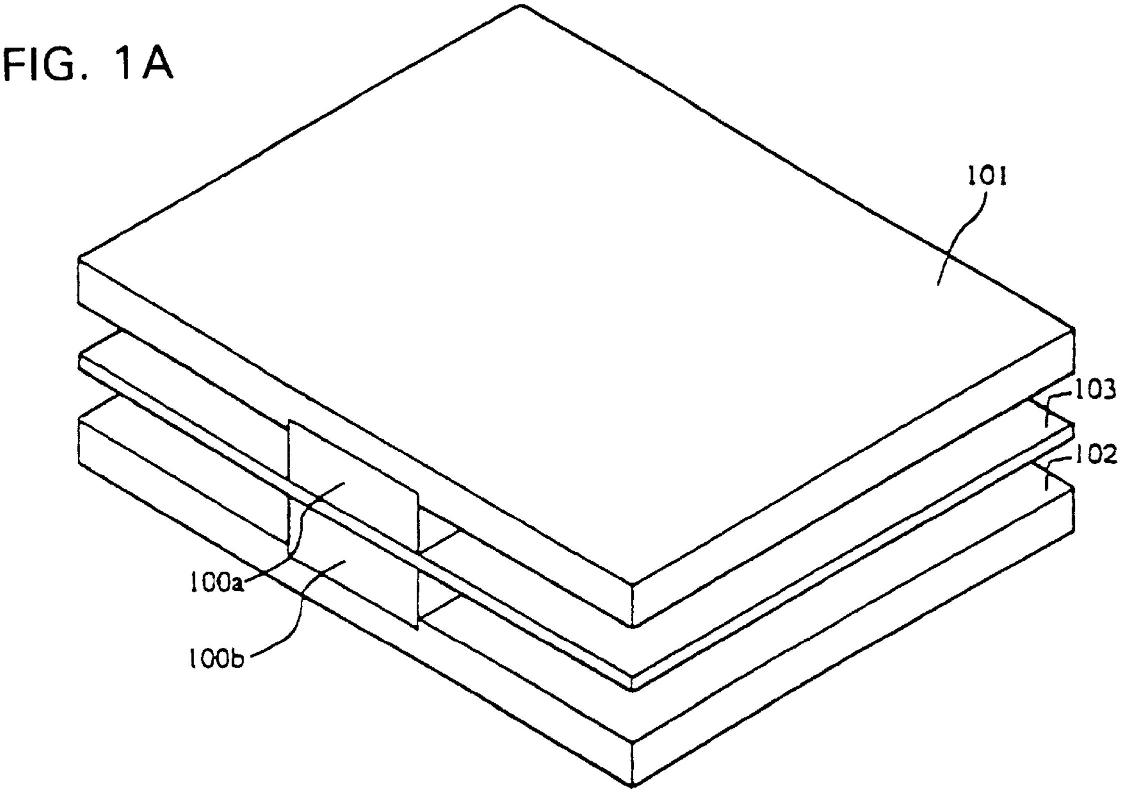
FIGS. 1A and 1B are partial perspective views illustrating the configuration of NRD waveguide, which is used in a transmitter-receiver that is a first embodiment of the present invention.
Figure 1B:
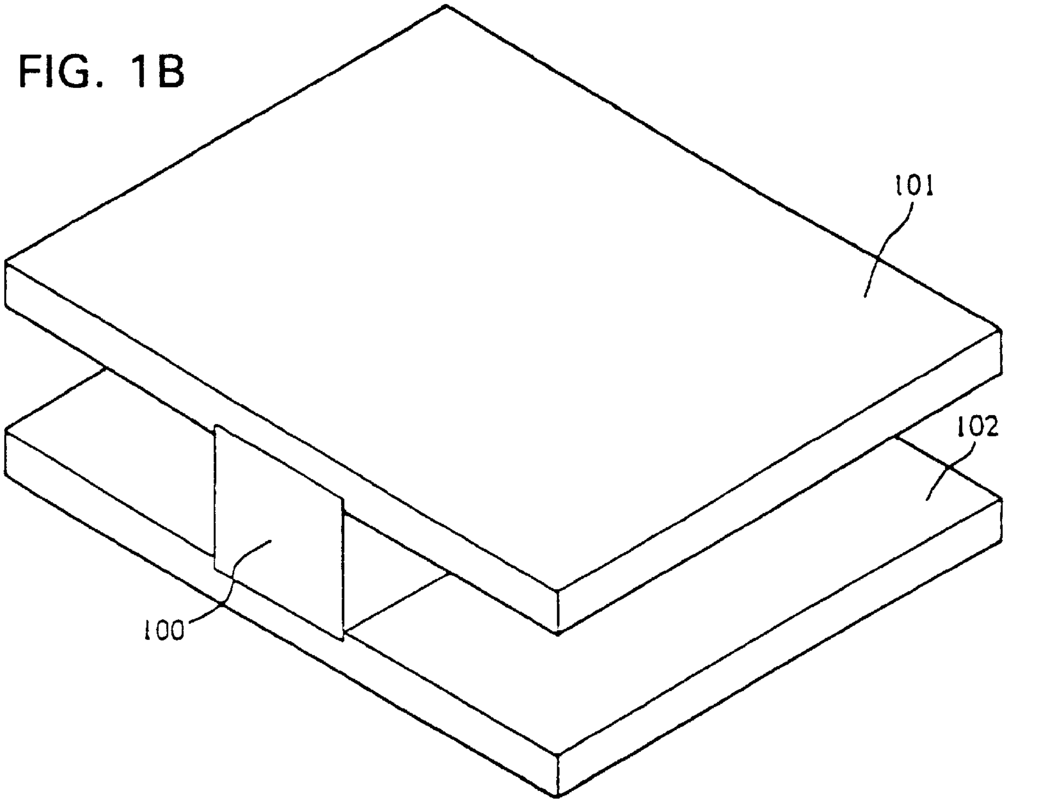

FIGS. 1A and 1B are partial perspective diagrams illustrating the configuration of NRD waveguides used in this transmitter-receiver. In FIG. 1A, reference numerals 101 and 102 designate conductive plates. Grooves are formed in these two conductive plates, respectively. Dielectric strips 100*a* and 100*b* and a substrate (or board) 103 are placed between these two conductive plates. In the case of the NRD waveguide of FIG. 1B, the dielectric strip 100 is disposed between the conductive plates 101 and 102, without using the substrate 103. The region containing the dielectric strip and the remaining region function as a propagating region and a non-propagating (or blocking) region, respectively. These functions are provided by determining the distance between the conductive plates and the dimensions and the relative dielectric constant of the dielectric strip.

Figure 2A:
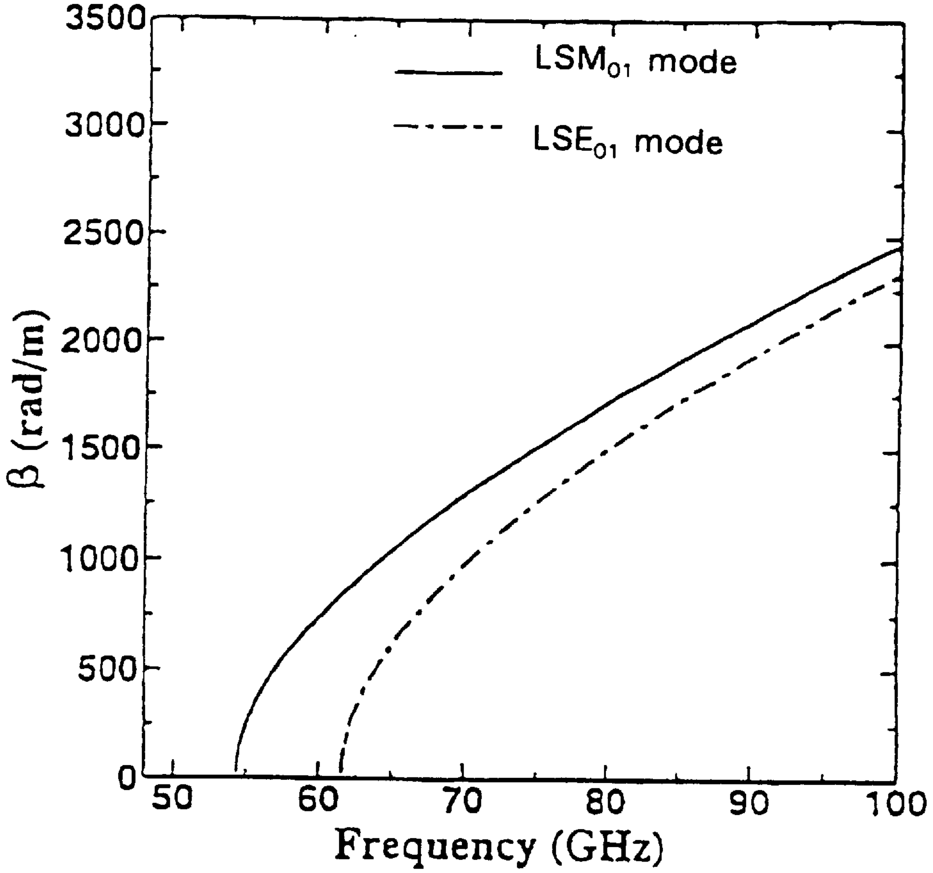
FIGS. 2A and 2B are a graph and a diagram for illustrating phase-constant-versus-frequency characteristics of the aforesaid NRD waveguide, respectively.
Figure 2B:
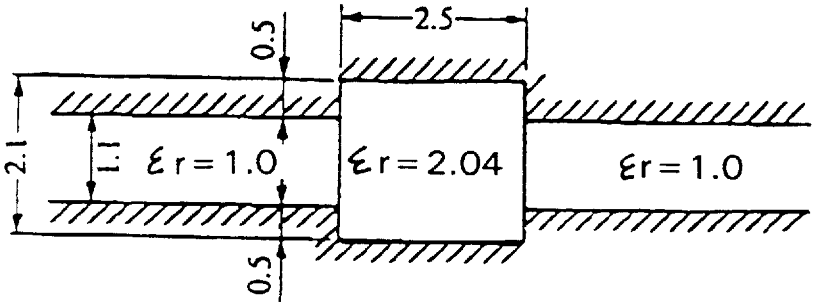

FIG. 2A is a characteristic diagram illustrating the phase-constant-β-to-frequency characteristics of an NRD waveguide whose dimensions and dielectric constant are determined as illustrated in FIG. 2B. Thus, waves in a single mode, namely, LSM01 mode, are propagated by setting the cut-off frequency corresponding to LSM01 mode as being lower than the cut-off frequency in LSE01 mode, in the 60-GHz band in the case of this figure.

Figure 3A:
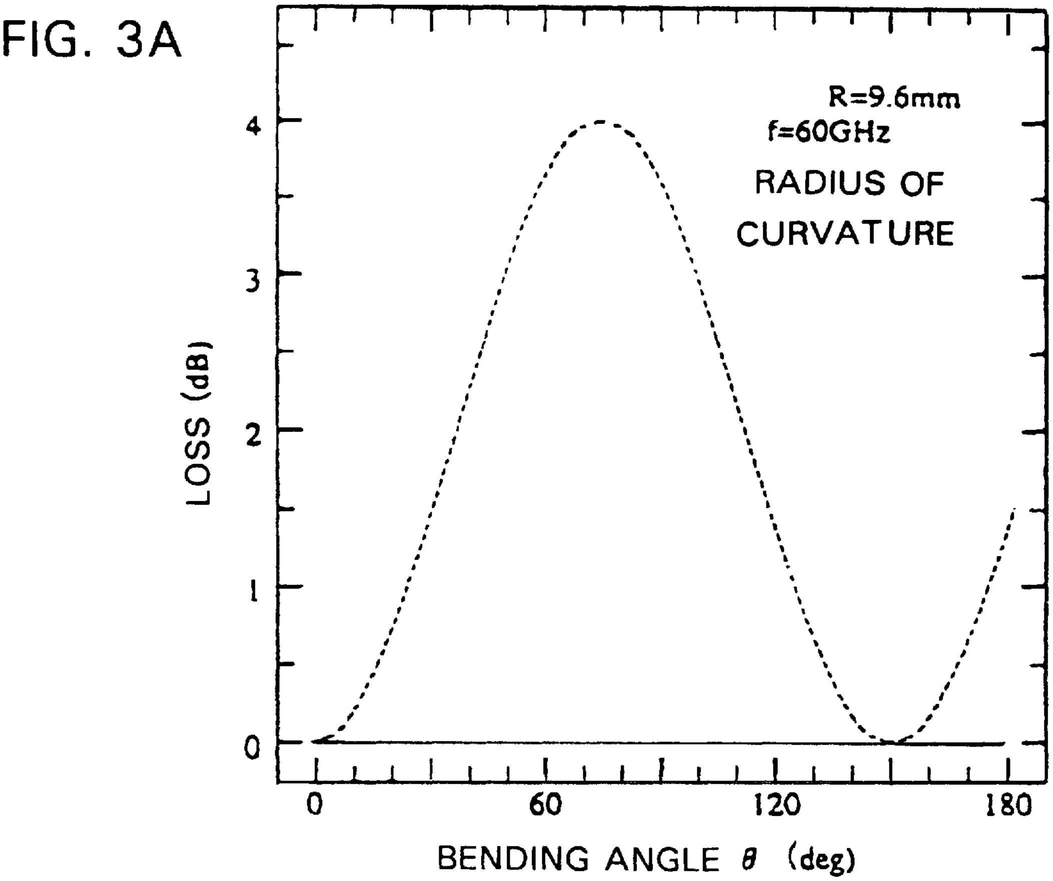
FIGS. 3A and 3B are a graph and a diagram for illustrating the relation between the loss and the bending angle of the bend portion of the aforesaid NRD waveguide, respectively.
Figure 3B:
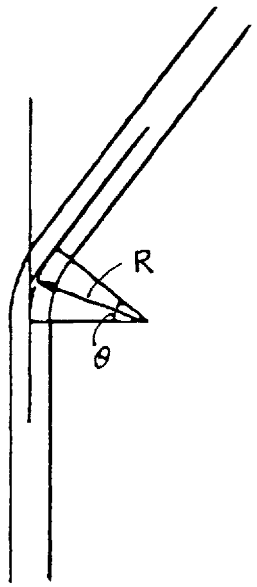
Figure 23A:
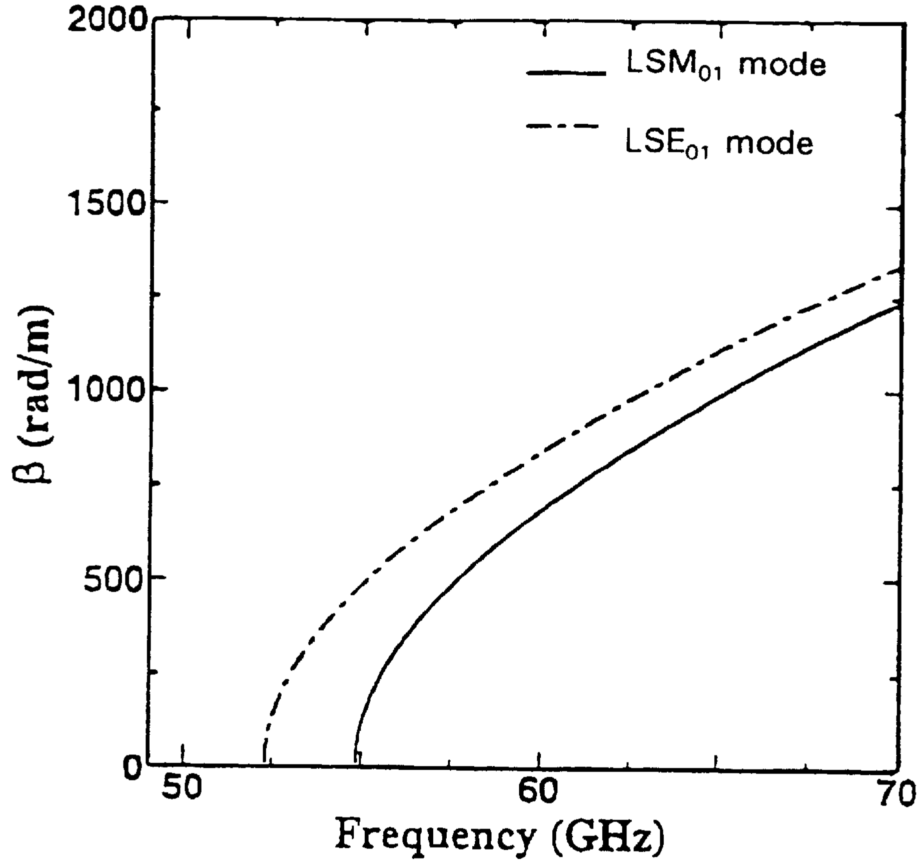
FIG. 23A PRIOR ART
FIGS. 23A and 23B are diagrams for illustrating an example of a relationship between the a phase constant and the frequency of the NRD waveguide shown in FIGS. 22A and 22B.
Figure 23B:
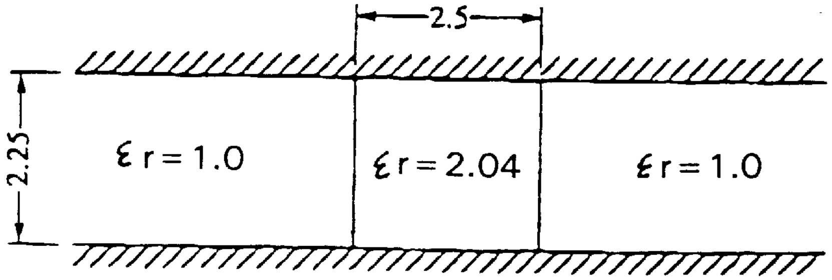
FIG. 23B PRIOR ART

FIG. 3A is a graph showing the relation between the bending angle θ and the transmission loss, in the case of an NRD waveguide whose bend portion has a prescribed radius of curvature R of 9.6 mm and a prescribed frequency of 60 GHz, for making a comparison with a conventional NRD waveguide. In FIG. 3A, a dashed line represents characteristics obtained by a calculation model illustrated in FIG. 23B. In contrast, a solid line represents characteristics obtained by a calculation model illustrated in FIG. 2B. As seen in this example, the transmission loss varies in a range between 0 to about 4 dB according to the bending angle θ in the case of using the conventional structure of NRD waveguide. However, in the case of the bend portion of NRD waveguide used in the transmitter-receiver of the present invention, the loss is 0 dB regardless of the bending angle θ. Incidentally, the loss calculation is performed by assuming that the transmitter-receiver is a no-loss system in which losses due to the dielectric portions and the conductive portions are neglected.

Figure 4:
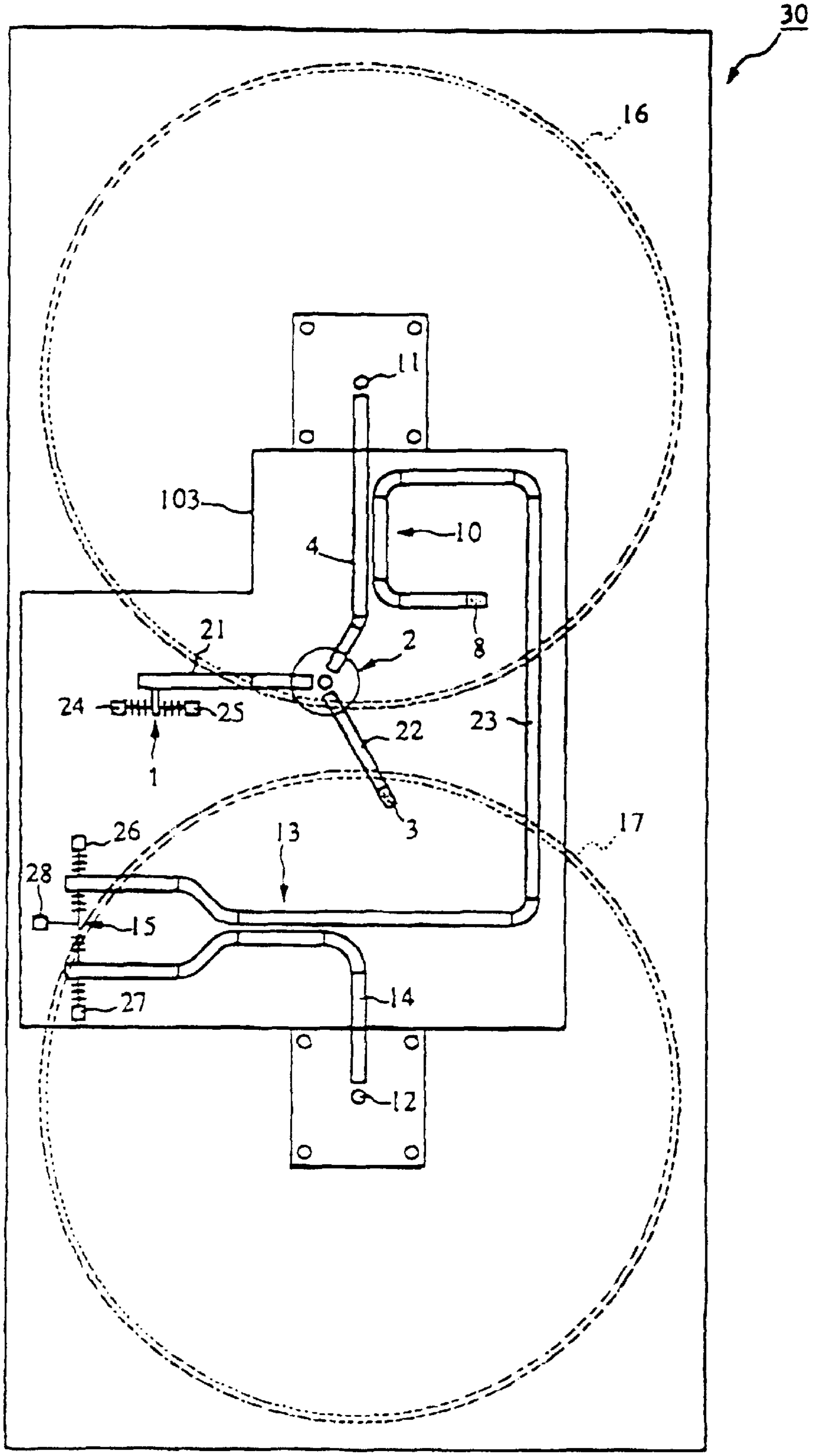
FIG. 4 is a plan view illustrating the configuration of a circuit unit of the transmitter-receiver, which is the first embodiment of the present invention.

FIG. 4 is a plan view illustrating the configuration of a circuit unit of the transmitter-receiver. Incidentally, an upper conductive plate is removed in this figure. In this figure, reference numeral 103 designates a substrate (or board). Further, dielectric strips of a same pattern are placed across this substrate, its on the top and bottom surfaces, respectively.

In this figure, reference numeral 1 denotes an oscillator provided on the substrate 103. A conductive line path and a RF-choke conductive pattern are provided in a direction perpendicular to the dielectric strip 21. A Gunn diode is connected to the aforementioned conductive line path. A varactor diode is connected between the conductive line path and the aforementioned RF choke conductive pattern. A bias voltage for the Gunn diode is applied to a bias terminal 24. The capacitance of the varactor diode is changed by inputting a modulation signal to a VCO-IN terminal 25. Thereby, the oscillation frequency of the Gunn diode is modulated.

The configuration of this oscillator 1 is similar to that of a non-radiative dielectric line path device serving as an oscillator or to that of an oscillator contained in an FM-CW front end portion of an embodiment described in the Japanese Patent Application No. 7-169949.

In FIG. 4, reference numeral 2 designates a circulator, in the central portion of which two disk-like ferrite elements are placed. Permanent magnets are disposed thereon in such a manner as to sandwich the central portion. A terminating device 3 obtained by mixing a resistor material into the dielectric material is provided at an end portion of a dielectric strip 22, which is a port of the circulator 2. Thus, an isolator is composed by this circulator and the terminating device.

A transmission signal propagating through the dielectric strip 21 is propagated through the circulator 2 to the dielectric strip 4. In this figure, there is shown an example in which the line path and the curved path (or bend portion) are constituted by separate parts, respectively. Further, dielectric strips continuously placed in series are designated by one reference character, for convenience of description.

Reference numeral 11 denotes a dielectric resonator of the primary radiator portion of the transmit antenna. This dielectric resonator radiates a signal, which is propagated from the dielectric strip 4, in an axial direction.

Reference numeral 12 designates a dielectric resonator of the primary radiator portion of the receive antenna. A reception signal propagates through the dielectric strip 14. In this figure, reference numeral 23 denotes a dielectric strip for constructing couplers 10 and 13 between the dielectric strips 23 and 4 and between the dielectric strips 23 and 14, respectively, and for connecting between these dielectric couplers 10 and 13. Similarly as in the case of the aforementioned terminating devices, a terminating device 8, which is obtained by mixing a resistor material into the dielectric material, is connected to an end portion of this dielectric strip 23.

A mixer 15 is provided at the other end of this dielectric strip 23 and an end portion of the dielectric strip 14. This mixer 15 is composed of a Schottky barrier diode, which is connected to receive electromagnetic waves propagating through the two dielectric strips 23 and 14, and an RF-choke conductive pattern which is provided on the substrate 103 and is operative to connect to both ends of this Schottky barrier diode. Terminals 26 and 27 thereof are grounded. IF signals are outputted from a terminal 28 of this mixer 15. Although this mixer 15 is a balanced mixer circuit, the latter end of the dielectric strip 23 is terminated. The mixer 15 is illustrated in a embodiment disclosed in the Japanese Patent Application No. 7-169949. Similarly as in the case of the mixer of the FM-CW front end portion, an unbalanced mixer may also be used as the mixer 15.

The coupler 13 is composed of a 3-dB directional coupler and equidistributes an LO signal, which is propagated from the dielectric strip 23, to the dielectric strips of the mixer 15 so that the phase difference between the equidistributed LO signals is 90 degrees. In addition, the coupler 13 equidistributes the reception signal, which is propagated from the dielectric strip 14, to the dielectric strips of the mixer 15 so that the phase difference between the equidistributed reception signals is 90 degrees.

Figure 5B:
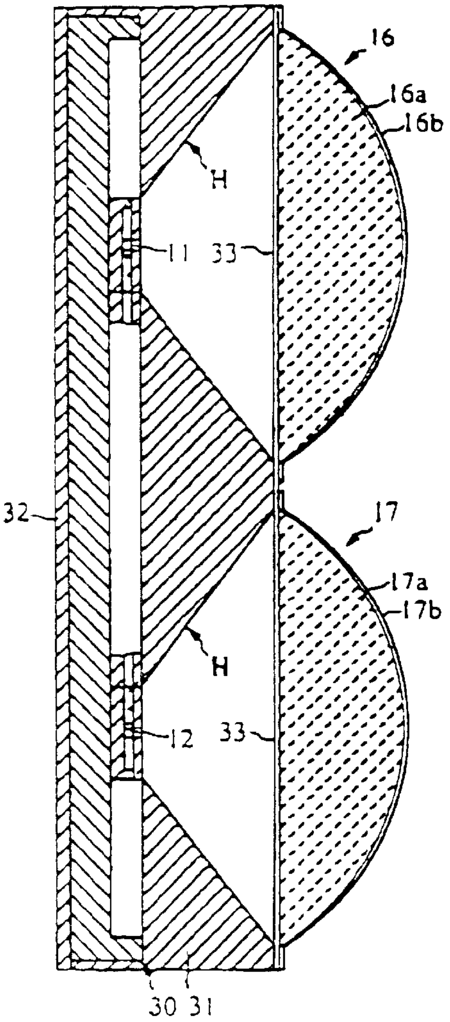
FIGS. 5A and 5B show a plan view and a sectional view of the aforesaid transmitter-receiver.
Figure 5A:
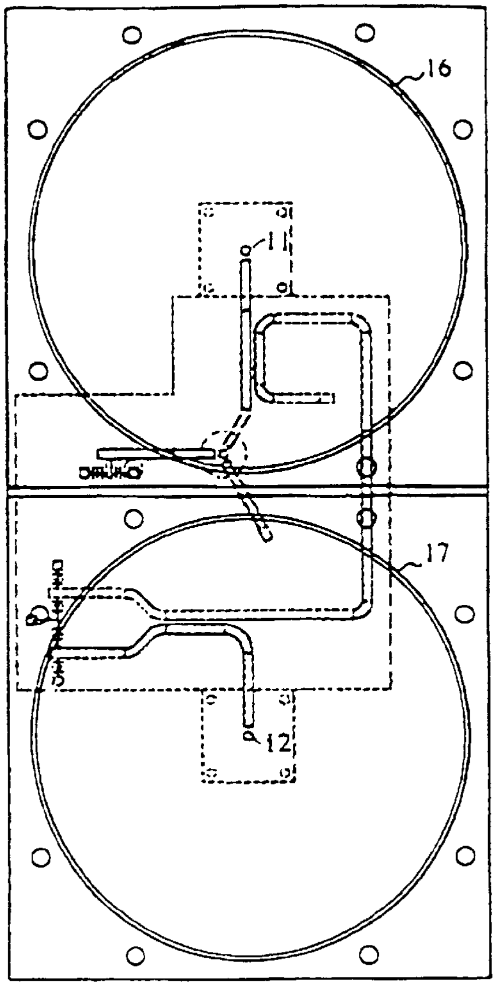

FIGS. 5A and 5B respectively show a plan view and a sectional view of the transmitter-receiver illustrated in FIG. 4. In FIGS. 5A and 5B, reference numeral 31 designates a case of the circuit unit 30 illustrated in FIG. 4; and 32 is a back cap thereof. A part of the case 31 is shaped like a horn designated by character H and has dielectric lenses 16 and 17 provided at front portions thereof, respectively. The dielectric lenses 16 and 17 include dielectric lens bodies 16*a* and 17*a,* whose relative dielectric constant ∈r=4, and matching layers 16*b,* 17*b* and 33, whose dielectric constant ∈r=2, provided at the front and rear portions thereof. Electromagnetic waves radiated from the dielectric resonator 11 are radiated with a predetermined beam width by converging the beam through the dielectric lens 16. Waves reflected from an object are incident on the dielectric resonator 12 through the dielectric lens 17.

Figure 6A:
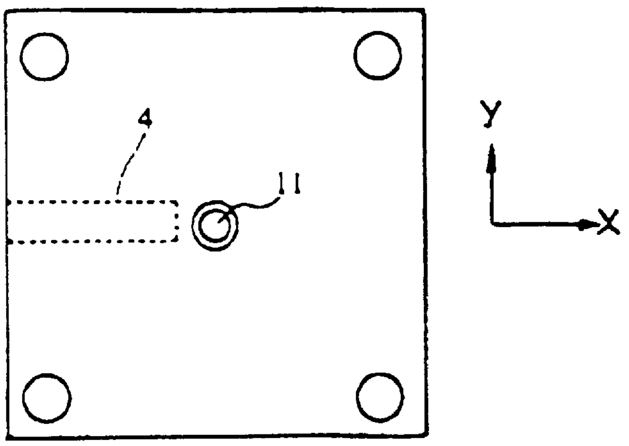
FIGS. 6A and 6B are a plan view and a sectional view of a primary radiator of the aforesaid transmitter-receiver, respectively.
Figure 6B:
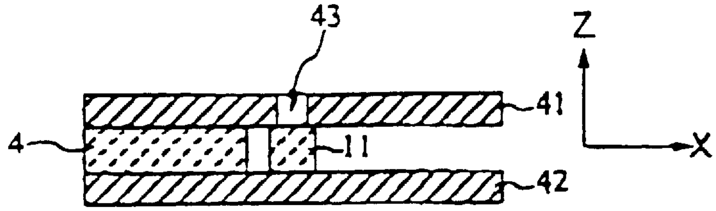

FIG. 6A and 6B are a plan view and a sectional view illustrating the configuration of a dielectric resonator portion, respectively. The dielectric strip 4 and the dielectric resonator 11 are provided between the conductive plates 41 and 42. A hole 43, which is coaxial with the dielectric resonator 11, is formed in a conductive plate 41. Thus, electromagnetic waves propagate through the dielectric strip 4 in LSM mode. In this mode, an electric field has a component which is perpendicular to the longitudinal direction (namely, the direction of the x-axis in these figures) of the dielectric strip 4 and is parallel to the direction of the conductive plates 41 and 42 (namely, the direction of the y-axis in these figures). Also a magnetic field has a component which is perpendicular to the direction of the conductive plates 41 and 42. Further, electromagnetic coupling is created between the dielectric strip 4 and the dielectric resonator 11, so that HE111 mode, which has an electric field component whose direction is the same as that of the dielectric strip 4, occurs in the dielectric resonator 11. Moreover, linearly polarized waves are radiated in a direction (namely, in the direction of the z-axis in these figures) perpendicular to the conductive plate 41 through an aperture 43.

Figure 7:
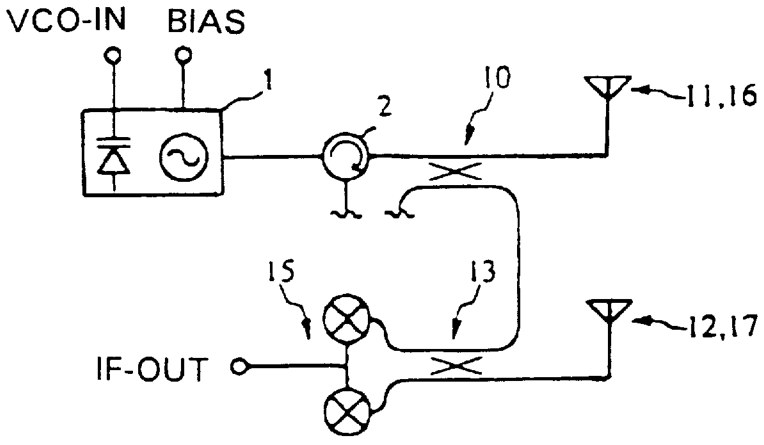
FIG. 7 is a circuit diagram showing an equivalent circuit of the transmitter-receiver which is the first embodiment of the present invention.

FIG. 7 is a circuit diagram showing an equivalent circuit of the transmitter-receiver of FIG. 4. The oscillator 1 is provided with a varactor diode and a Gunn diode. Oscillation signals outputted therefrom are radiated through the dielectric resonator 11 and the dielectric lens 16. RF signals received through the dielectric lens 17 and the dielectric resonator 12 propagate through the dielectric strip 14 and are then mixed with LO signals by the couplers 10 and 13. The mixed signal (namely, the RF signal+the LO signal) are inputted to the mixer 15. As above stated, the mixer 15 is operative to act as a balanced mixer and to obtain the difference component between the RF and LO signals from the mixed signal and to output a signal representing the obtained difference component.

Figure 8A:
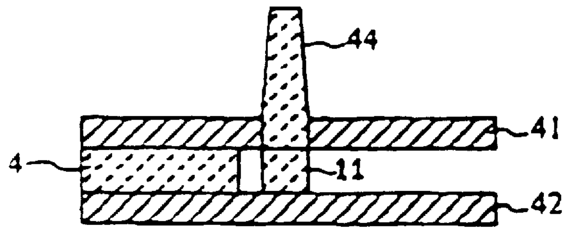
FIGS. 8A, 8B and 8C are sectional diagrams showing other examples of the configuration of the primary radiator.
Figure 8B:
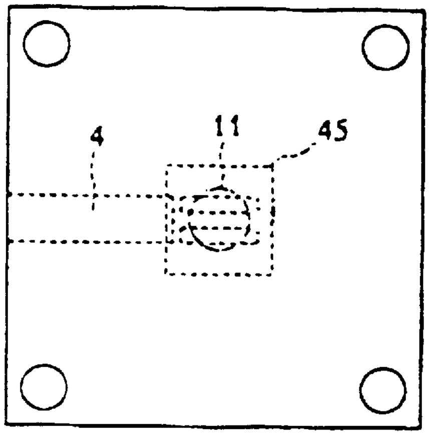
Figure 8C:
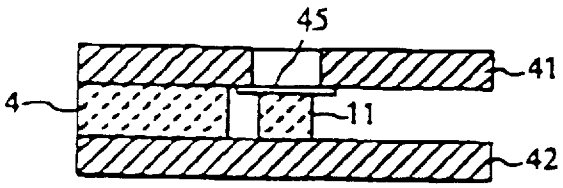

FIGS. 8A, 8B and 8C are sectional diagrams showing two other examples of the configuration of the antenna portion. In the example illustrated in FIG. 6, an aperture 43 is provided in the upper conductive plate 41 above the dielectric resonator 11. However, instead, a dielectric rod 44 as shown in FIG. 8A may be provided. This dielectric rod acts as a dielectric rod antenna and thus, the directivity of the antenna is enhanced. Moreover, as illustrated in a plan view in FIG. 8B and a sectional view in FIG. 8C, a slot plate 45, which is obtained by forming an aperture slot in a metallic plate or by forming a slot pattern in a conductive film of a circuit board, may be placed between the dielectric resonator 11 and the upper conductive plate 41.

Figure 9A:
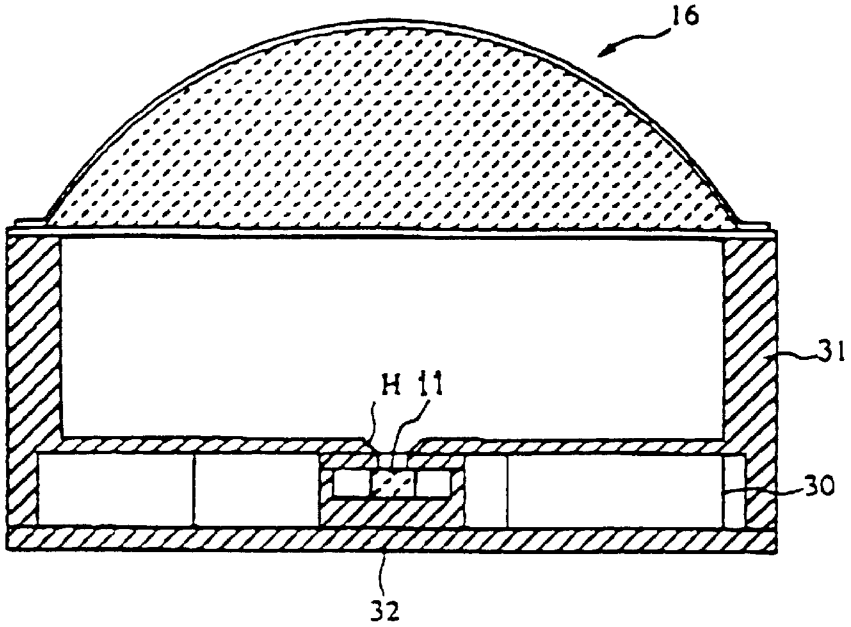
FIGS. 9A and 9B are sectional diagrams illustrating another example of the configuration of the circuit unit mounted onto a case.
Figure 9B:
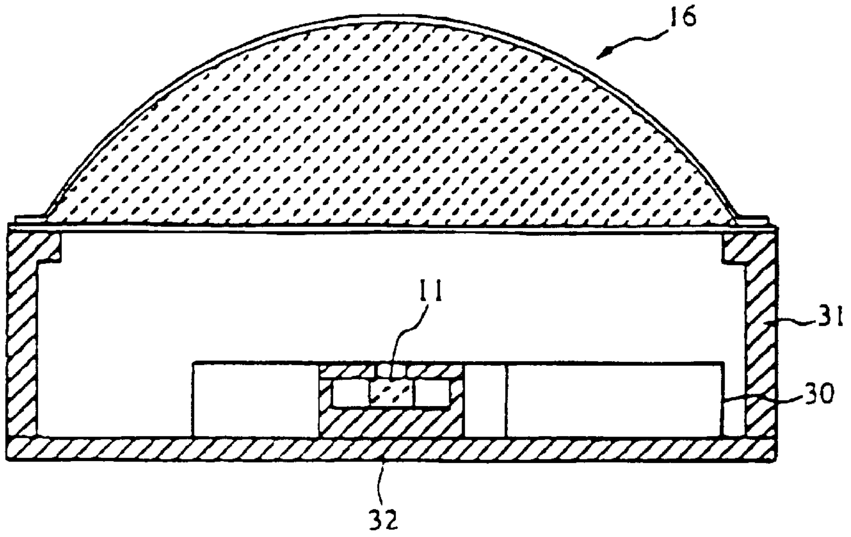

FIGS. 9A and 9B are sectional diagrams illustrating another example of the configuration of the circuit unit mounted onto the case. In the case of the example illustrated in FIG. 5, a horn-shaped portion H is formed in the case 31. This is not indispensable for the transmitter-receiver of the present invention. Further, the circuit unit 30 is not necessarily provided in the lower portion of the case 31 as in FIG. 5. For example, as illustrated in FIG. 9B, the circuit unit 30 may be provided in the main portion of the case 31.

Incidentally, the configuration in which the circuit unit 30 is attached to the lower portion of the case 31 as shown in FIGS. 5 and 9A, has advantageous effects in that the radiation of leakage waves through the dielectric lens from a joint between the primary radiator and another NRD waveguide is prevented, and electromagnetic waves are prevented from being incident on the aforementioned joint through the dielectric lens from the outside of the transmitter-receiver.

Next, another transmitter-receiver, which is the second embodiment of the present invention, will be described hereinbelow with reference to FIGS. 10A, 10B and 11.

Figure 10A:
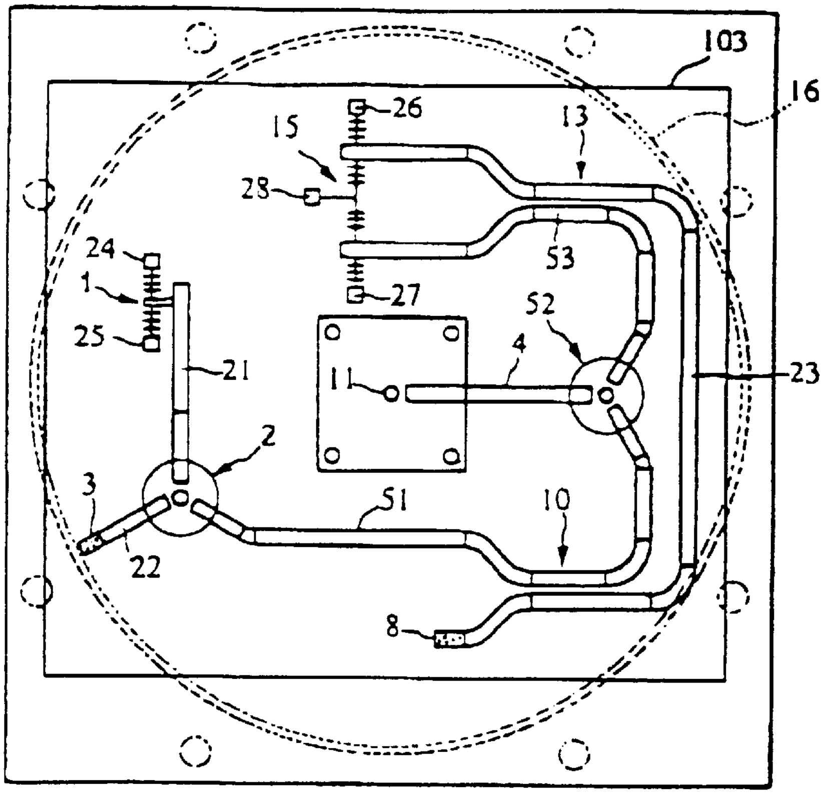
FIGS. 10A and 10B are a plan view of a circuit unit of the transmitter-receiver, which is a second embodiment of the present invention, and a sectional view of this transmitter-receiver, respectively.
Figure 10B:
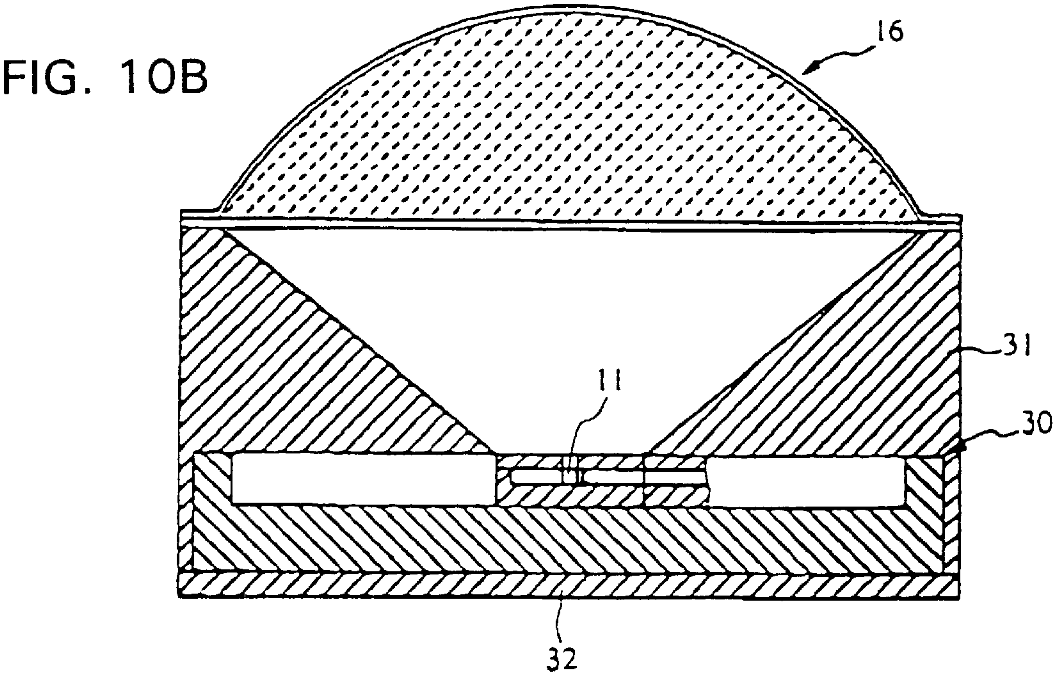

FIGS. 10A and 10B are a plan view of the circuit unit of the transmitter-receiver and a sectional view of this transmitter-receiver, respectively. In FIG. 10A, the upper conductive plate is removed. In this figure, reference numerals 21, 22, 51, 23, 4 and 53 are dielectric strips; 2 and 52 circulators; and 3 and 8 terminating devices. Further, reference numeral 10 denotes a coupler formed by utilizing the dielectric strips 51 and 23; and 13 a coupler serving as a 3-dB directional coupler formed by utilizing the dielectric strips 23 and 53. The oscillator 1 and the mixer 15 are constructed on the substrate (or board) 103. In the case of this second embodiment of the present invention, a transmit/receive antenna is used in common by providing the circulator 52 therein. The configurations of the oscillator 1, the mixer 15, the circulator 2, the terminating devices 3 and 8, and the coupler 10 and 13 are similar to those of the corresponding elements of the example of FIG. 4, except for their the placement.

Figure 11:
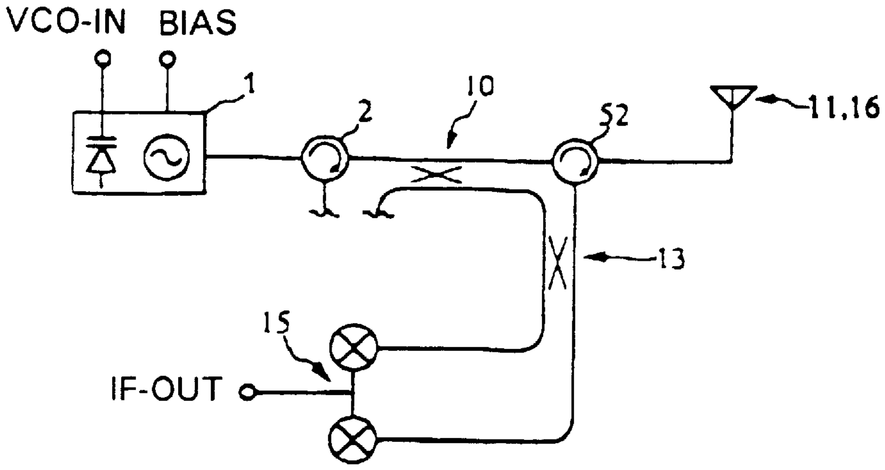
FIG. 11 is a circuit diagram showing an equivalent circuit of the transmitter-receiver illustrated in FIGS. 10A and 10B.

FIG. 11 is a circuit diagram showing an equivalent circuit of the transmitter-receiver illustrated in FIGS. 10A and 10B. In FIG. 11, a signal outputted from the oscillator 1 is propagated through the circulator 2, the coupler 10, and the circulator 52 to the dielectric resonator 11. Further, such a signal is radiated through this dielectric resonator 11 and the dielectric lens 16 to the outside of the transmitter-receiver. On the other hand, a reception signal is supplied to the mixer 15 through the circulator 52 and the coupler 13. The mixer 15 acts as a balanced mixer and outputs an IF signal representing the difference component between the RF and LO signals.

Figure 12:
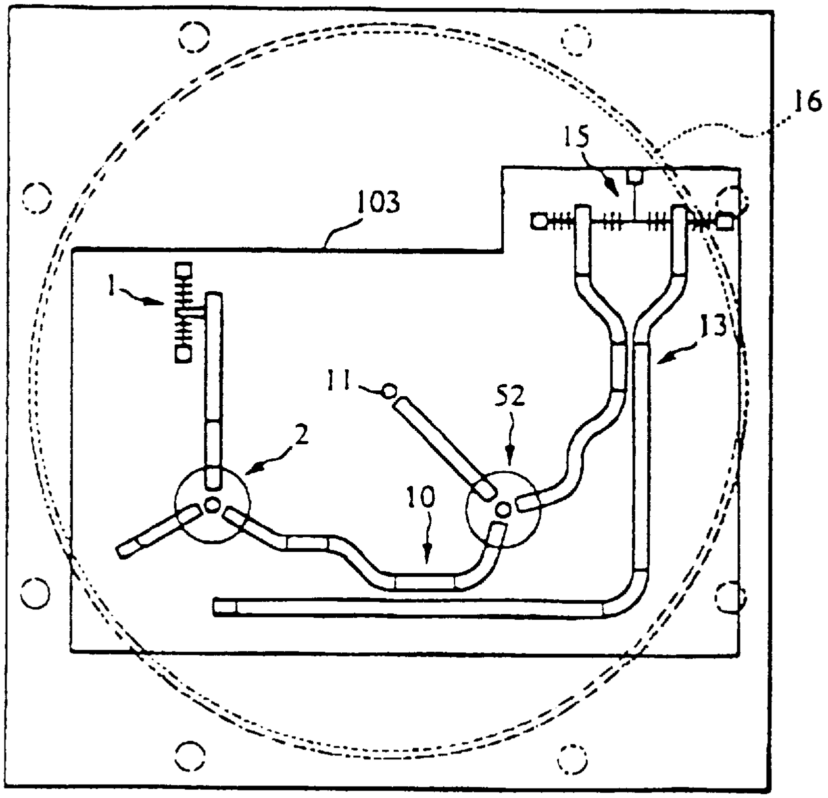
FIG. 12 is a plan view illustrating another example of the configuration of the circuit unit of the transmitter-receiver of the second embodiment of the present invention.

FIG. 12 shows an example of a modification of the aforementioned circuit unit. Dielectric resonator 11 is excited at 45 degrees to the ground. Thus, the placement of each element onto the substrate (or board) 103 is facilitated. Consequently, the miniaturization of the substrate 103 is achieved.

Figure 13:
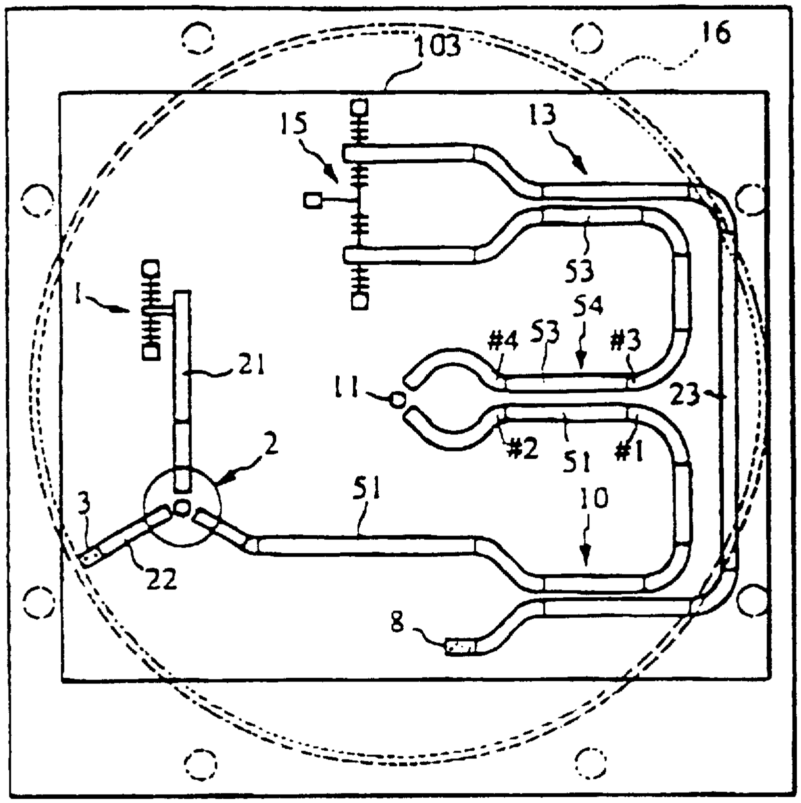
FIG. 13 is a plan view of a circuit unit of a transmitter-receiver which is a third embodiment of the present invention.

Next, still another transmitter-receiver, which is the third embodiment of the present invention, will be described. FIG. 13 illustrates the configuration of the circuit unit of this transmitter-receiver which is the third embodiment of the present invention. This embodiment is adapted to transmit and receive circularly polarized waves, so that the need for the circulator 52 shown in FIG. 10 is eliminated. Namely, in FIG. 13, reference numeral 54 designates a coupler acting as a 3-dB directional coupler formed from parallel linear paths composed of the dielectric strips 53 and 51. The coupler 54 causes the edge portions of the dielectric strips 53 and 51 to face the dielectric resonator 11, which is in HE111 mode, at 90 degrees thereto. With this configuration, a transmission signal having been incident on the coupler 54 from a port #1 is equidistributed and outputted from ports #2 and #4 so that the phase difference between the signals respectively corresponding to these ports is 90 degrees. Thereby, the dielectric resonator 11 is excited and radiates circularly polarized waves. In contrast, a reception signal having been incident thereon in an oppositely polarized manner, similarly to the transmitted wave, is outputted only to a port #3, because the reception signal, which goes to the port #1 through the coupler 54 again, is canceled owing to the presence of the phase difference of 90 degrees when the reception signals reach the ports #2 and #4. Consequently, the function of branching the wave is achieved.

Figure 14:
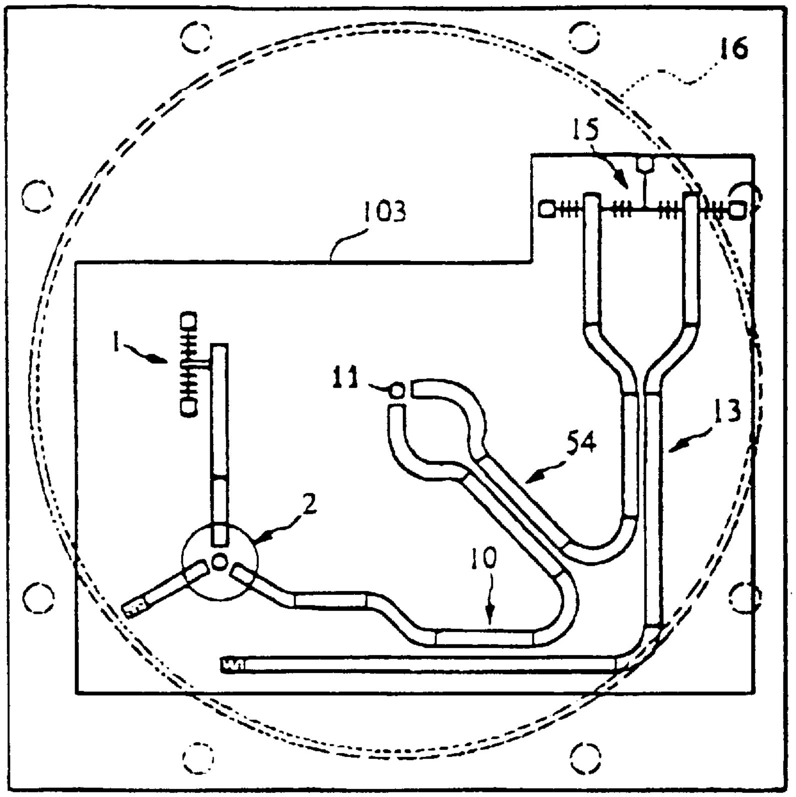
FIG. 14 is a plan view illustrating another example of the configuration of the circuit unit of the transmitter-receiver which is the third embodiment of the present invention.

FIG. 14 shows an example of a modification of the aforementioned circuit unit. Similarly to the example of FIG. 12, the placement of each element to the substrate 103 is facilitated by supplying power to the dielectric resonator 11 at 45 degrees to the ground. The reduction in size of the substrate or board 103 is attained.

Figure 15:
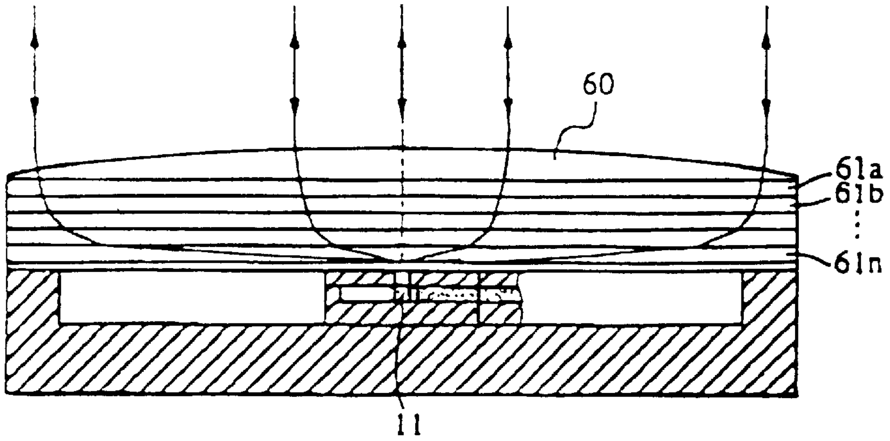
FIG. 15 is a cross-sectional diagram illustrating another example of the configuration of a dielectric lens.
Figure 16:
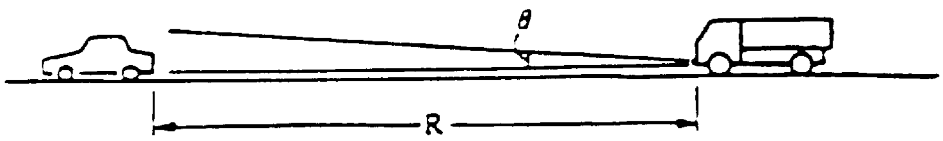
FIG. 16 PRIOR ART
FIG. 16 is a diagram for illustrating the manner of using an automobile millimeter-wave radar and for also illustrating the relation between the beam width of a transmitted wave and the detected distance.
Figure 17:
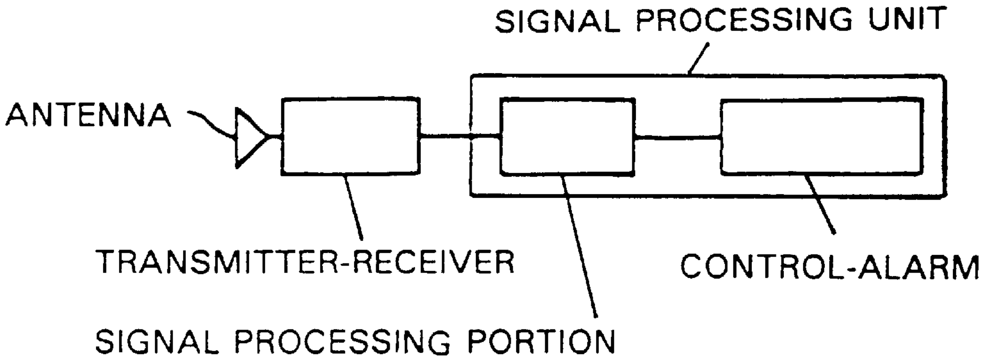
FIG. 17 PRIOR ART
FIG. 17 is a block diagram illustrating the configuration of an automobile millimeter-wave radar.
Figure 19:
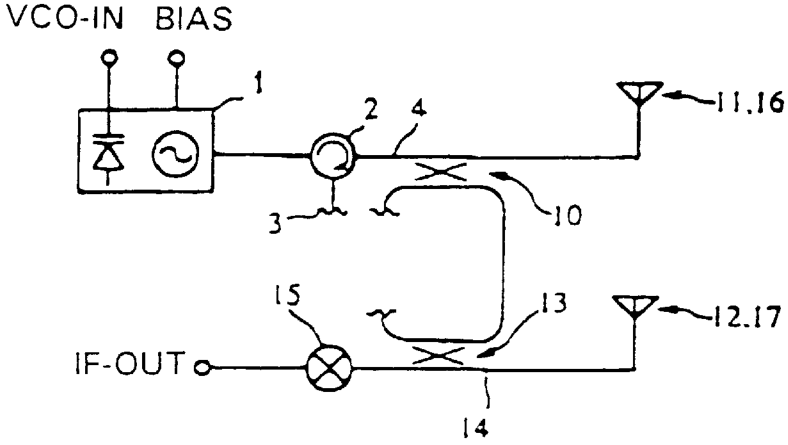
FIG. 19 PRIOR ART
FIG. 19 is a diagram illustrating an equivalent circuit of the transmitter-receiver shown in FIG. 18.
Figure 18:
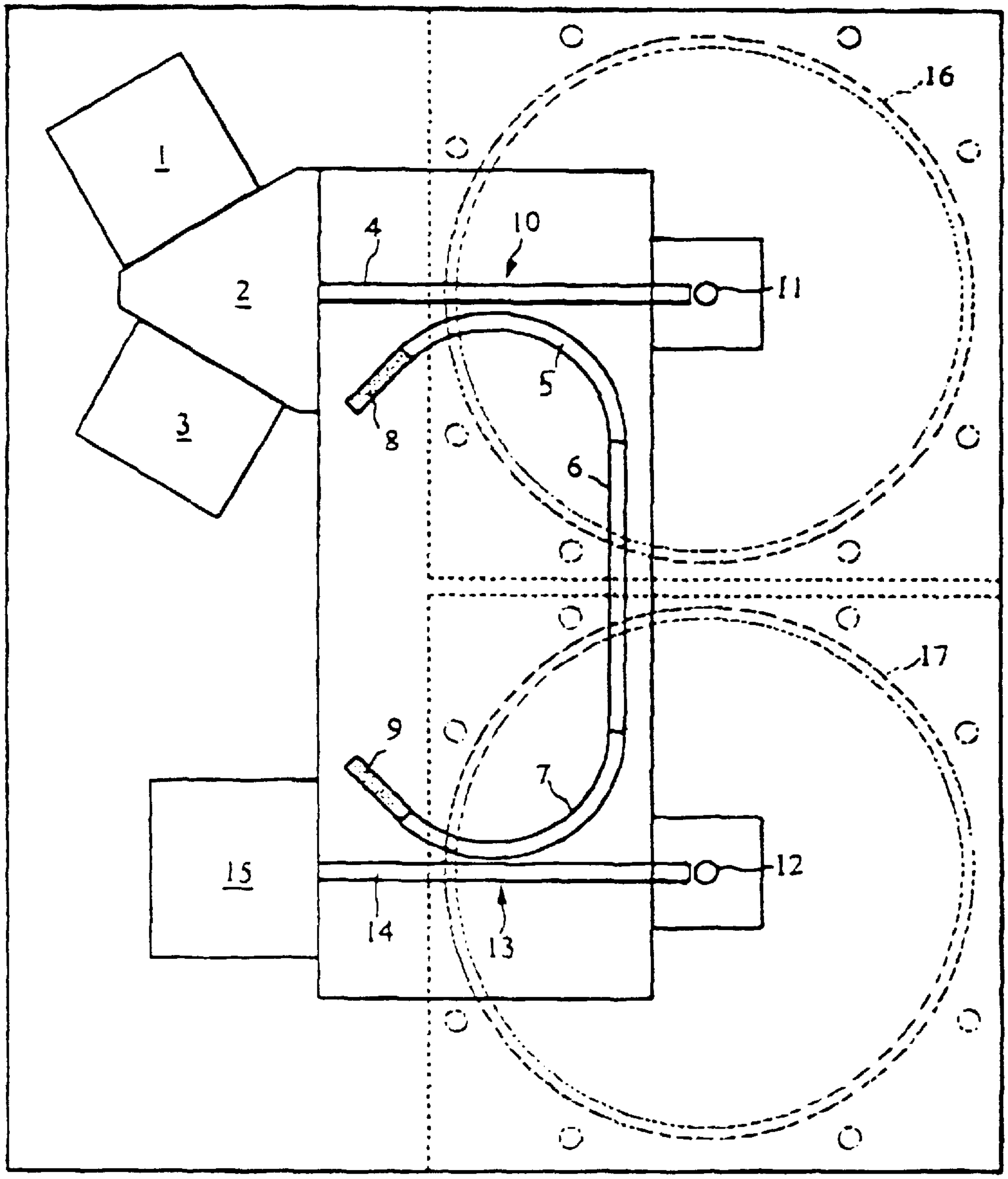
FIG. 18 PRIOR ART
FIG. 18 is a schematic plan view illustrating the configuration of a prior art transmitter-receiver.
Figure 20:
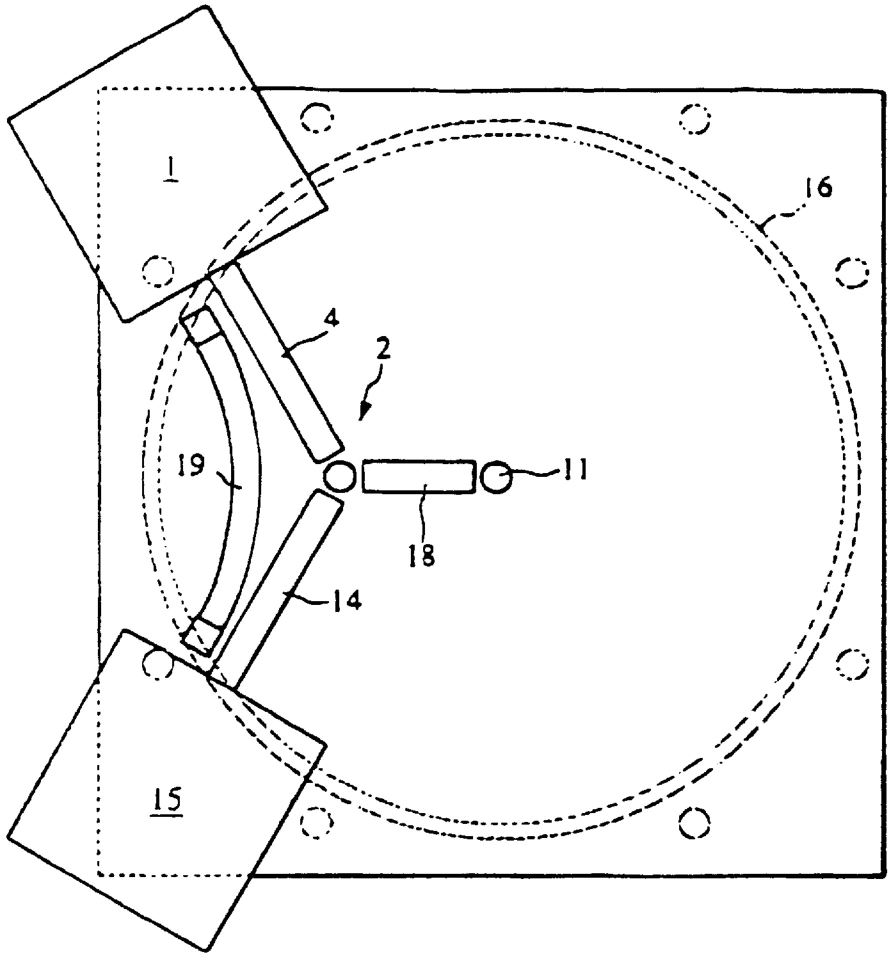
FIG. 20 PRIOR ART
FIG. 20 is a schematic plan view illustrating the configuration of another example of the prior art transmitter-receiver.
Figure 21:
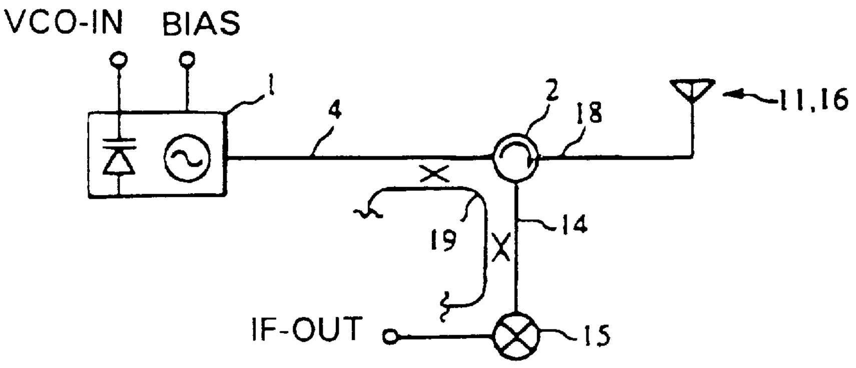
FIG. 21 PRIOR ART
FIG. 21 is a diagram illustrating an equivalent circuit of the transmitter-receiver shown in FIG. 20.
Figure 22A:
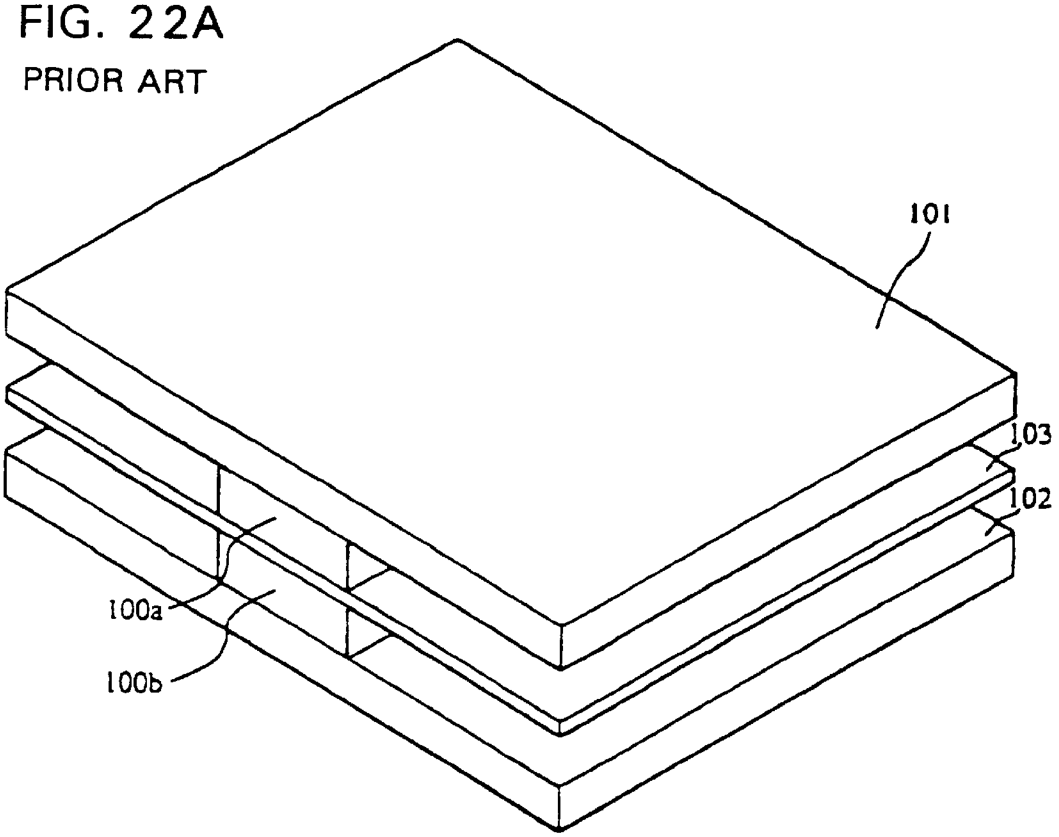
FIG. 22A PRIOR ART
FIGS. 22A and 22B are partial perspective views illustrating examples of NRD waveguides used in the prior art transmitter-receiver.
Figure 22B:
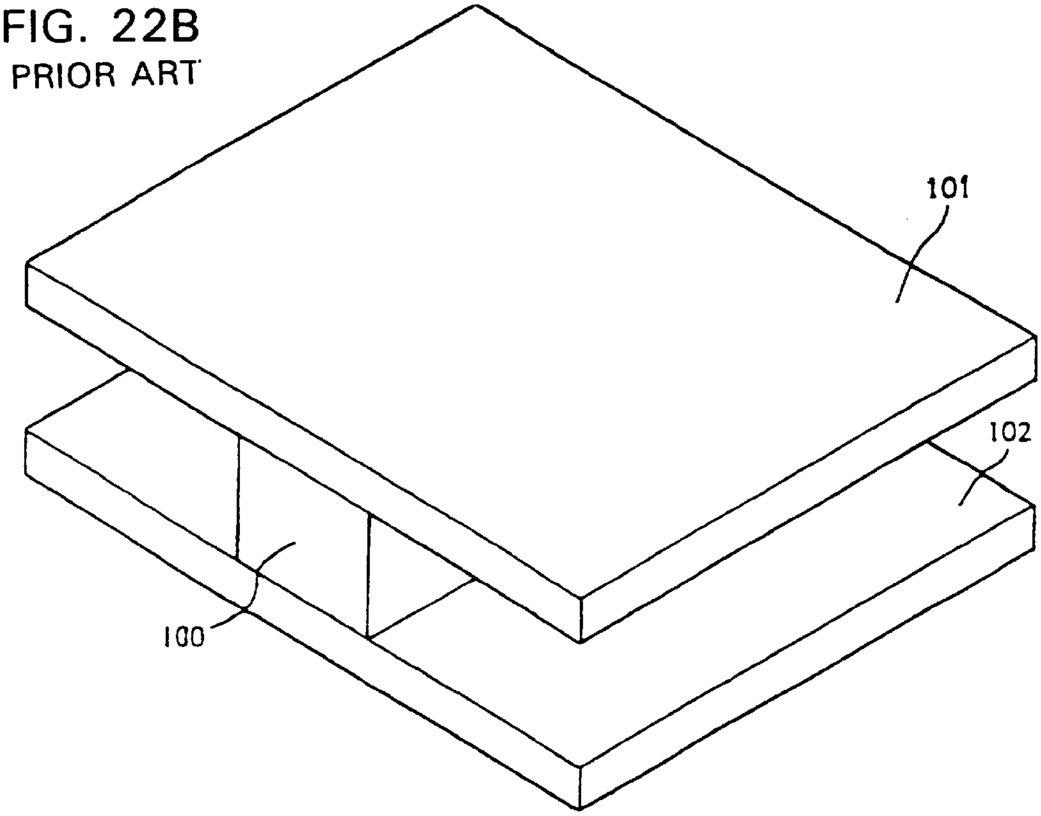
FIG. 22B PRIOR ART

In the aforementioned embodiments, dielectric lenses, whose relative dielectric constant is basically uniform, are used. However, a dielectric lens may be used having multiple layers of dielectric materials, which have different respective dielectric constants, as illustrated in FIG. 15. In FIG. 15, reference numeral 60 denotes a dielectric lens element having a convex surface; and 61*a*, 61*b*, . . . , 61*n* dielectric layers which are different in dielectric constant from one another. Further, a relative-dielectric-constant gradient is imposed on the dielectric layers so that the relative dielectric constant gradually decreases from the top dielectric 61*a* to the bottom dielectric layer 61*n* in stages. A dielectric lens is configured by stacking these dielectric layers. Thus, the height from the dielectric resonator of the primary radiator to the top portion of the dielectric lens is decreased by using the dielectric lens with a relative dielectric constant gradient. Consequently, the thickness of the entire transmitter-receiver can be reduced. Moreover, the antenna gain can be enhanced by making the intensity of electromagnetic waves passing through the dielectric lens aperture (namely, the illuminance distribution) more uniform. Consequently, the size of the transmitter-receiver can be further decreased by an amount corresponding thereto.

Incidentally, in the aforementioned embodiments, the elements such as the circulator, the mixer and the coupler are placed a single substrate or board. However, the circuit unit may be constructed as follows. Since only certain elements, such as the oscillator and the mixer, require a substrate or board, these elements are composed of a substrate as well as the upper and lower conductive plates and the dielectric strips. However, the elements such as the circulator and the coupler, which do not require a substrate or board, are composed only of the upper and lower conductive plates and the dielectric strips. Thus, the circuit unit is constituted by a combination of these separate elements.

Furthermore, in the aforementioned embodiments, the linear path and the bend portion are divided (namely, formed separately from one another). However, these elements may be formed in such a manner as to be integral with one another.

Additionally, the aforementioned embodiments employ the FM-CW method, by which the modulation is performed by using triangular waves. However, a method of performing the frequency modulation by using pulse waves may also be adopted.

Although embodiments of the present invention have been described above, it should be understood that the present invention is not limited thereto and that other modifications will be apparent to those skilled in the art without departing from the spirit of the invention.

What is claimed is:

1. A transmitter-receiver comprising a transmit antenna, a receive antenna and a plurality of elements including at least a millimeter-wave oscillator and a mixer, said plurality of elements being connected with one another through NRD waveguides each having a dielectric strip interposed between two substantially parallel conductive plates, wherein:

said transmit antenna and said receive antenna each comprise a vertical primary radiator and a dielectric lens, said transmit antenna and said receive antenna are placed side by side, a distance between a propagating region and a non-propagating region, and a dielectric constant of a dielectric material interposed between said propagating region and said non-propagating region, are determined in each of said NRD waveguides so that a cut-off frequency in LSM01 mode is lower than a cut-off frequency in LSE01 mode, and said plurality of elements and said NRD waveguides are placed in a rear part of said dielectric lens or in a rear part of an area at which said dielectric lens is mounted.

2. A transmitter-receiver comprising a transmit/receive antenna and a plurality of elements including at least a millimeter-wave oscillator and a mixer, said plurality of elements being connected with one another through NRD waveguides each having a dielectric strip interposed between two substantially parallel conductive plates, wherein said transmit/receive antenna comprises a vertical primary radiator and a dielectric lens, a distance between a propagating region and a non-propagating region, and a dielectric constant of a dielectric material interposed between said propagating region and said non-propagating, region are determined in each of said NRD waveguides so that a cut-off frequency in LSM01 mode is lower than a cut-off frequency in LSE01 mode, and said plurality of elements and said NRD waveguides are placed in a rear part of said dielectric lens or in a rear part of an area at which said dielectric lens is mounted.

3. The transmitter-receiver according to claim 2, wherein said vertical primary radiator is constituted by a dielectric resonator which operates in HE111 mode, wherein an edge portion of an NRD waveguide for transmitting a transmission signal to said dielectric resonator and an edge portion of an NRD waveguide for receiving a reception signal from said dielectric resonator are set in such a manner as to face each other in a direction at 90 degrees to said dielectric resonator, a 3-dB directional coupler is constituted between said NRD waveguides, NRD waveguides connect between said millimeter-wave oscillator and said isolator, between said isolator and said 3-dB directional coupler and between said 3-dB directional coupler and said mixer, respectively, a coupler constituted by an NRD waveguide is connected to said NRD waveguide for transmitting a transmission signal and to said NRD waveguide for transmitting a reception signal and is operative to give a mixture of a transmission signal and a reception signal.

4. The transmitter-receiver according to claim 3, wherein said dielectric lens is constructed of multiple layers of dielectric materials which have different dielectric constants, respectively.

5. The transmitter-receiver according to claim 2, wherein said dielectric lens is constructed of multiple layers of dielectric materials which have different dielectric constants, respectively.

6. The transmitter-receiver according to claim 1, wherein said dielectric lens is constructed of multiple layers of dielectric materials which have different dielectric constants, respectively.

* * * * *